United States Patent
Pfaff et al.

[11] Patent Number: 5,536,447
[45] Date of Patent: Jul. 16, 1996

[54] SUBSTRATE-FREE CONDUCTIVE PIGMENTS

[75] Inventors: Gerhard Pfaff, Münster; Gerd Bauer, Kleinostheim, both of Germany

[73] Assignee: Merck Patent Gesellschaft mit beschrankter Haftung, Darmstadt, Germany

[21] Appl. No.: 317,649

[22] Filed: Sep. 30, 1994

[30] Foreign Application Priority Data

Oct. 2, 1993 [DE] Germany .................. 43 33 673.6

[51] Int. Cl.$^6$ ................. H01B 1/06; H01B 1/14
[52] U.S. Cl. .................. 252/518; 106/400; 106/401; 106/481; 524/401
[58] Field of Search .................. 106/455, 401, 106/481, 400, 903; 252/518; 524/409, 410, 401

[56] References Cited

U.S. PATENT DOCUMENTS

| | | | |
|---|---|---|---|
| 3,923,698 | 12/1975 | Kamigaito | 252/518 |
| 4,431,764 | 2/1984 | Yoshizumi | 252/518 |
| 4,655,966 | 4/1987 | Guillaumon | 252/518 |
| 5,246,623 | 9/1993 | Giersberg et al. | 252/518 |
| 5,269,970 | 12/1993 | Ruf et al. | 252/518 |
| 5,284,705 | 2/1994 | Cahill | 252/518 |
| 5,296,168 | 3/1994 | Jacobson | 106/441 |
| 5,320,781 | 6/1994 | Stahlecker et al. | 252/518 |
| 5,376,307 | 12/1994 | Hagiwara et al. | 252/518 |

FOREIGN PATENT DOCUMENTS

| | | |
|---|---|---|
| 0441427 | 8/1991 | European Pat. Off. . |
| 0487366 | 5/1992 | European Pat. Off. . |

OTHER PUBLICATIONS

DIN 53 596, Nov. 1960, Germany.

*Primary Examiner*—Mark L. Bell
*Assistant Examiner*—Michael Marcheschi
*Attorney, Agent, or Firm*—Millen, White, Zelano & Branigan

[57] ABSTRACT

Substrate-free electrically conductive pigment containing 90 to 98% by weight of tin oxide and 1 to 10% by weight of at least one doping substance consisting of an oxide of an element form main group III, IV or V of the Periodic Table with the exception of tin, which pigment is preparable by intimate mixing of tin dioxide with at least one doping substance, followed by calcining of the resulting mixture at 800° to 1,000° C. for 30 to 120 minutes.

13 Claims, No Drawings

SUBSTRATE-FREE CONDUCTIVE PIGMENTS

FIELD OF THE INVENTION

The invention relates to electrically conductive yellowish-white pigments.

BACKGROUND OF THE INVENTION

In many areas of industry, there is a need for conductive pigments which make it possible to produce, for example, plastics, paints, coatings or fibers which are electrically conductive, antistatic, or shield off electromagnetic waves. For this purpose, conductive carbon black is used in large amounts but cannot be employed for transparent, light-colored or colored coatings due to its high light absorption in the visible region of the spectrum. Another problem is the strong absorption of carbon black in the IR region, as a result of which the coated articles heat up when exposed to insulation, for example, which is often undesirable. In the case of light-colored coatings, nickel-coated graphite, metal platelets and mixed oxides, for example, antimony-doped tin oxide, are therefore used. The mixed oxides mentioned may also have been deposited on supports, for example, on platelet-like mica or spherical barium sulphate.

U.S. Pat. No. 4,568,609 describes conductive platelet-like pigments in which a platelet-like substrate has been overcoated with a conductive layer of antimony-doped tin oxide.

The conductive layer is applied to the substrate by metering salts of zinc and antimony at a predetermined mixing ratio and a suitable pH to an aqueous suspension of the substrate in such a manner that in each case hydrolysis and deposition of the hydroxides or hydrated oxides on the platelet-like substrate take place immediately. After coating is complete, the pigment is separated off, washed and dried and calcined at 650° to 850° C.

The preparation of a substrate-free conductive pigment is described in EP-A-0,441,427. This is done by mixing the alcoholic solution of a tin salt with the aqueous solution of a fluoride, separating off, drying and calcining the precipitated tin hydroxide at 500° C.

Apart from the wet-chemical preparation of conductive mixed oxides, electrically conductive mixed oxides can also be prepared by a dry high-temperature treatment. U.S. Pat. No. 4,655,966 describes the preparation of antimony-doped tin oxide by intimate mixing of tin dioxide and antimony trioxide in a ratio of 1.25 to 10 parts by weight of antimony oxide to 100 parts by weight of tin dioxide, followed by heating the resulting mixture to 900° to 950 ° C.

The nearly white pigment is used for electrically conductive white or colored coatings of aircraft, in order to prevent an accumulation of static electricity on electrically non-conductive parts. However, varnishes such as those selected from the group consisting of acrylate resin, alkyd resin, amino resin, polyester resin, polyurethane resin and epoxy resin, containing the conductive pigment can also be used in the electronics industry.

EP-A-0,487,366 describes antistatic and radio-transparent coatings for antennas of space satellites. The pigment used for this purpose consists of tin dioxide and titanium dioxide which are both doped with antimony. They are prepared by intimate mixing of 30 to 73 parts of $SnO_2$, 70 to 27 parts of $TiO_2$ and 0.1 to 10 parts of $Sb_2O_3$, followed by calcining of the mixture at 700 to 1,000° C. for 5 to 10 hours. Alternatively, in order to improve the degree of whiteness of the paint, a non-conductive white pigment, for example $TiO_2$, ZnO, $Zn_2TiO_4$, $ZnSnO_4$ or $SnTiO_4$, can be added to the paint.

The values given for the surface resistance of the coating are 2–500 MΩ per unit area. The conductivity of this paint is too low for antistatic coatings for which a surface resistance of less than 1 MΩ is usually required.

SUMMARY OF THE INVENTION

The object of the invention is to widen the range of conductive pigments preparable by high-temperature treatment of oxide mixtures and to increase the conductivity of these pigments.

According to the present invention, this object is achieved by a substrate-free electrically conductive pigment containing 90 to 98% by weight of tin oxide and 1 to 10%, preferably 3–10% by weight of at least one doping substance consisting of an oxide of an element from main group III, IV or V of the Periodic Table with the exception of tin, which pigment can be prepared by intimate mixing of tin dioxide with at least one doping substance, followed by calcining of the resulting mixture at 850° to 950° C. for 30 to 90 minutes.

The invention also provides paints, printing inks, plastics, such as those selected from the group consisting of polyethylene, polypropylene, polyvinyl chloride polystyrene and copolymers of them, or coatings pigmented with the pigment according to the invention. For plastics, the pigment is used in an amount of between 20–40 wt. percent and for varnishes the pigment is used in an amount of between 5–25 wt. percent. The surface resistivity of the pigmented materials can be less than 200 kΩ or can be less than 2 mΩ.

DETAILED DESCRIPTION OF THE PREFERRED EMBODIMENTS

The doping substances used for the tin oxide are oxides of the elements from main group III, IV or V of the Periodic Table. Preference is given to oxides of the elements aluminium, gallium, indium, silicon, germanium and antimony.

The oxides are added to the tin dioxide to be doped individually or as a mixture. It is however also possible to use salts of the abovementioned elements, for example carbonates or nitrates, instead of the oxides, as the starting materials.

The weighed powders of the starting materials are intimately mixed by known methods and milled in a ball mill or other intensive mills while dry or wet to a particle size of 0.5 μm to 10 μm.

The mixing ratio between tin dioxide and one or more doping substances is such that a doping substance content in the form of one or more oxides of 1 to 10 % by weight is obtained in the pigment. The tin dioxide used should have an $SnO_2$ content of >99%. The doping substances should in each case contain more than 99% of the corresponding product.

The powder mixture is calcined at a temperature of 800° to 1,000° C., preferably 850° to 950° C. The calcining time is 30 to 120 minutes, preferably 60 to 90 minutes. Calcining can take place in conventional furnaces, for example in ram-type furnaces, chamber furnaces or continuous furnaces. Heating of the reaction mixture can be effected such that the mixture is placed directly in the static furnace preheated to the reaction temperature. In a continuous furnace, heating to the reaction temperature can take place over a period of 5 to 60 minutes, preferably 10 to 30 minutes. In the case of some doping substances, for example alumina, calcining must take place under an inert gas.

The pigments prepared according to the invention exhibit a yellowish-white to white colour. The resistivity is between 50 and 200 $\Omega$cm. The resistance values are stable over a period of more than 6 months. The pigments according to the claimed invention can have a size between 1–50 μm or between 1–10 μm and the specific powder resistivity of the pigments can be between 30 $\Omega$cm to 20 M$\Omega$cm or can be between 50 $\Omega$cm to 1 M$\Omega$cm.

The resistivity of the pigments was determined by the following method:

In an acrylic glass tube, 2 cm in diameter, a small amount of about 0.5 g of pigment is compressed by means of a weight of 10 kg between 2 metal pistons. The electrical resistance R of the pigments thus compressed is then measured. The resistivity $\rho$ is calculated from the layer thickness L of the compressed pigment using the relationship $$\rho = R \cdot \frac{\pi \cdot (d/2)^2}{L} \quad [\text{ohm} \cdot \text{cm}]$$

To measure the resistance of the pigmented application system, for example a paint, 15 parts by weight of pigment are incorporated in 85 parts by weight of binder solution (acrylate-melamine resin: 59.9 g, diluent: 25.1 g). A thin film of this paint is applied to a metal sheet and the surface resistance measured in accordance with DIN standard 53596 using a flexitongue electrode.

The surface resistance of the various paint samples is between 15 and 130 k$\Omega$. The values are lower by 1 to 2 powers of ten compared with the conductive coating composition claimed in EP-A-487,366.

The examples below serve to illustrate the invention without limiting it.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding application(s) German P 43 33 673.6, are hereby incorporated by reference.

EXAMPLES

Example 1

To prepare a conductive pigment according to the invention, first 97.1 g of $SnO_2$, 1.9 g $Sb_2O_3$ and 1.0 g of $SiO_2$ having particle sizes of 1 to 20 μm were weighed.

The dry mixture of oxides was then comminuted and homogenized for 30 minutes in a ball mill. The reaction mixture was then placed in a calcining dish and transferred to the furnace heated to 950° C. and made to react at this temperature in air for I hour. After this time, the sample was removed from the furnace. Cooling-to room temperature took place in air.

Examples 2–10

Examples 2–10 were carried out by repeating Example I and varying the starting materials and their proportions in the mixture and the calcining temperature and calcining time in accordance with Table 1.

TABLE 1

| Example | g of $SnO_2$ | g of $Sb_2O_3$ | g of $TiO_2$ | g of $Al_2O_3$ | g of $SiO_2$ | Calcining temp. (°C.) | Calcining time (h) | Calcining atm. | Resistivity ($\Omega$cm) |
|---|---|---|---|---|---|---|---|---|---|
| 2 | 96.2 | 1.9 | | | 1.9 | 950 | 1 | L | 88 |
| 3 | 94.3 | 1.9 | | | 3.8 | 950 | 1 | L | 110 |
| 4 | 94.3 | 3.8 | | | 1.9 | 950 | 1 | L | 126 |
| 5 | 96.2 | 1.9 | | 1.9 | | 950 | 1 | L | 150 |
| 6 | 93.5 | 4.7 | | 1.8 | | 950 | 1 | L | 160 |
| 7 | 94.3 | 1.9 | | 1.9 | 1.9 | 950 | 1 | L | 89 |
| 8 | 96.0 | 1.0 | 1.0 | 1.0 | 1.0 | 950 | 1 | L | 134 |
| 9 | 90.0 | | | 10.0 | | 900 | 1 | FG | 630 |
| 10 | 96.0 | | | 4.0 | | 900 | 1 | FG | 130 |

L=air, FG=forming gas (95% of $N_2$, 5% of $H_2$). $TiO_2$ was only used in the rutile modification.

The pigments obtained from Examples 2, 5, 7, 8 and 10 were incorporated in an acrylate-melamine resin as described above, and a thin film of the resulting paint was applied to a metal sheet. The values obtained for the surface resistance are shown in Table 2.

TABLE 2

| Example | Surface resistance of the paint (k$\Omega$) |
|---|---|
| 2 | 15 |
| 5 | 130 |
| 7 | 15 |
| 8 | 100 |
| 10 | 120 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Substrate-free electrically conductive pigment containing 90 to 98% by weight of tin oxide and 1 to 10% by weight of at least one doping substance consisting of an oxide of an element selected from the group consisting of aluminum, silicon, and gallium, which pigment is preparable by intimate mixing of tin dioxide with at least one doping substance, followed by calcining at 800° to 1,000° C. for 30 to 120 minutes.

2. Paint, varnish, printing ink, plastic or coating composition pigmented with a pigment according to claim 1.

3. A pigment according to claim 1 having a specific powder resistivity of 30 Ωcm to 20 MΩcm.

4. A pigment according to claim 1 having a specific powder resistivity of 50 Ωcm–1 MΩcm.

5. A pigment according to claim 1 having a particle size of from 1–50 μm.

6. A pigment according to claim 1 having a particle size of from 1–10 μm.

7. A paint, varnish, printing ink, plastic or coating composition of claim 2 having a surface resistance of less than 2 mΩ.

8. A paint, varnish, printing ink, plastic or coating composition of claim 2 having a surface resistance of smaller than 200 kΩ.

9. A plastic of claim 2 selected from the group consisting of polyethylene, polypropylene, polyvinyl chloride, polystyrene and copolymers of them.

10. A plastic as in claim 9, wherein the pigment is present in an amount of 20–40% wt. %.

11. A varnish of claim 2 selected from the group consisting of acrylate resin, alkyd resin, amino resin, polyester resin, polyurethane resin and epoxy resin.

12. A varnish as in claim 11, wherein the pigment is present in an amount of 5–25 wt. %.

13. A pigment according to claim 1 which contains 3–10% by weight of at least one doping substance.

* * * * *